United States Patent [19]

Knepel et al.

[11] Patent Number: 5,420,480
[45] Date of Patent: May 30, 1995

[54] AUTOMATIC HEADLAMP SWITCHING SYSTEM

[75] Inventors: Allen R. Knepel, Waukesha; James R. Doornek, Mequon, both of Wis.

[73] Assignee: Douglas Dynamics, Inc., Milwaukee, Wis.

[21] Appl. No.: 923,129

[22] Filed: Jul. 31, 1992

[51] Int. Cl.⁶ ............................................. H05B 37/00
[52] U.S. Cl. ....................................... 315/82; 315/90; 362/80; 307/108
[58] Field of Search ................. 315/83, 77, 88, 90, 315/89, 93, 82; 362/80; 307/10.8

[56] References Cited

U.S. PATENT DOCUMENTS

| | | | |
|---|---|---|---|
| 1,066,432 | 7/1913 | Kettering . | |
| 3,309,563 | 3/1967 | McKienzie | 315/83 |
| 3,814,984 | 6/1974 | Morita et al. | 315/83 |
| 4,104,560 | 8/1978 | Kato et al. | 315/83 |
| 4,280,062 | 7/1981 | Miller et al. | 307/10 |

Primary Examiner—Robert J. Pascal
Assistant Examiner—Michael B. Shingleton
Attorney, Agent, or Firm—Michael, Best & Friedrich

[57] ABSTRACT

The invention contemplates an automatic headlamp switching system that enables an operator to use an existing vehicle headlamp switch to operate a secondary light source on an accessory unit attached to a vehicle. The vehicle includes a primary circuit having a primary light source, an energy source, and a parking-/headlamp switch for connecting the energy source and the primary light source so that the primary light source is selectively energizable. A secondary circuit includes the secondary light source. A pair of relays are connectable in circuit with the primary and secondary light sources. When the accessory unit is electrically connected to the vehicle, the relays are operative to interrupt the primary circuit from the energy source to the primary light source and simultaneously complete the secondary circuit from the energy source to the secondary light source.

18 Claims, 2 Drawing Sheets

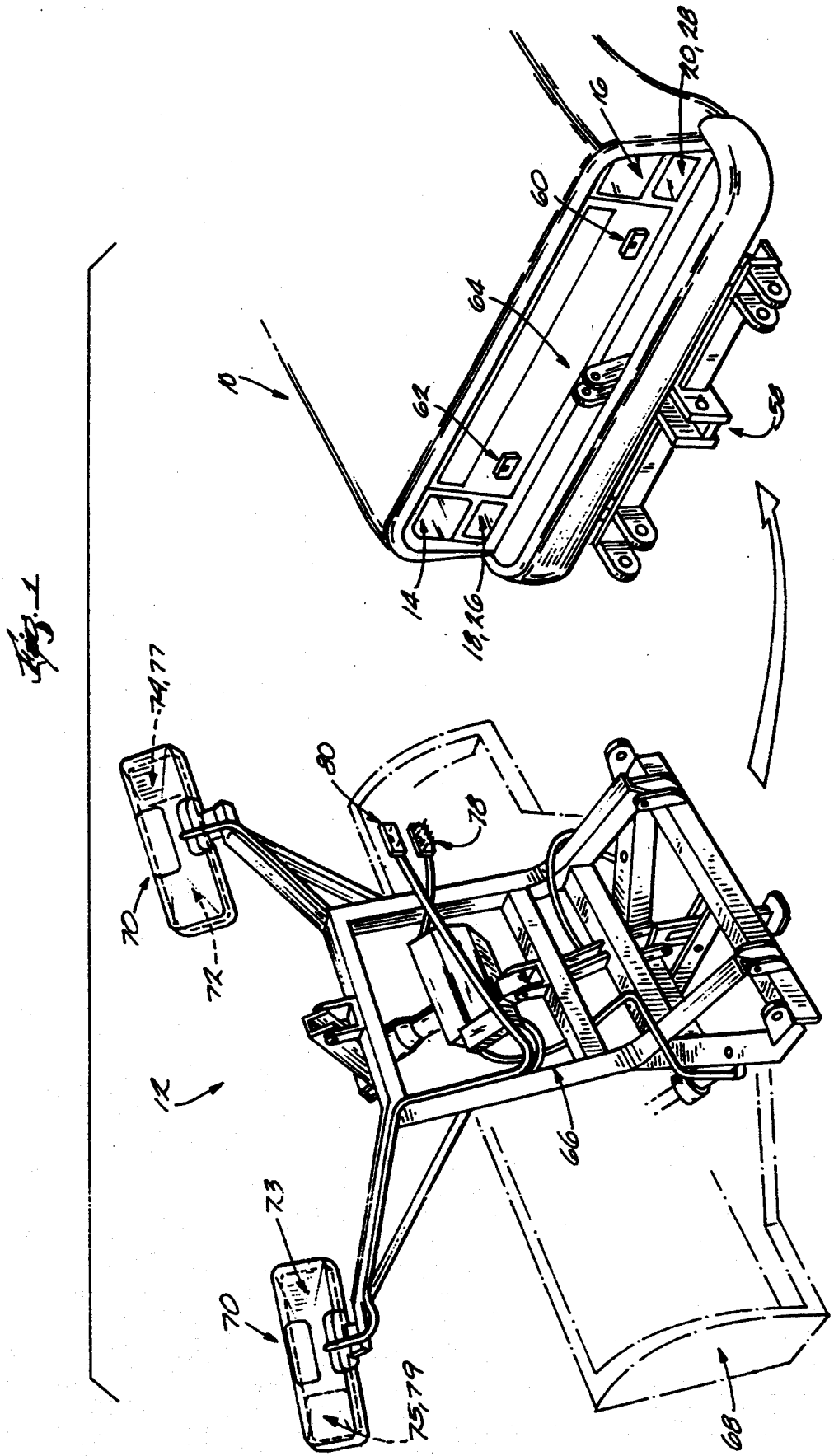

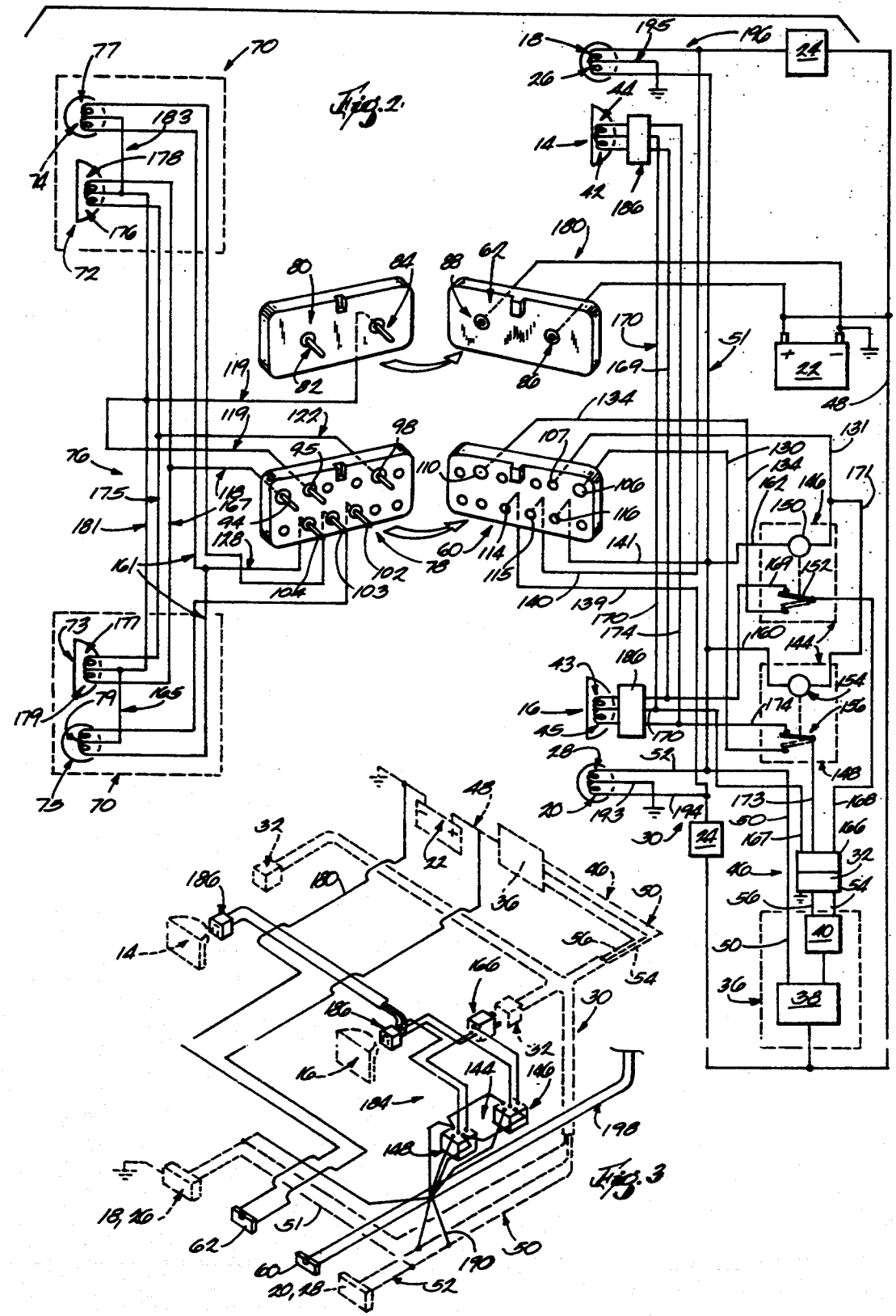

AUTOMATIC HEADLAMP SWITCHING SYSTEM

BACKGROUND OF THE INVENTION

1. Field of the Invention

The present invention relates to an automatic headlamp switching system, and more specifically to an automatic headlamp switching system for motor vehicles having attached accessory units.

2. Description of the Prior Art

When accessory units, such as snowplows, are attached to a motor vehicle, it is often necessary to provide a lighting source for the accessory unit because the vehicle lighting source or vehicle headlamps are often blocked or partially blocked by the snowplow itself. For example, on conventionally attached snowplows, headlamps are provided on the snowplow for illuminating the area in front of the vehicle and the snowplow. In order to illuminate the snowplow headlamps included on the conventional set-up, the required electrical connections from the vehicle to the snowplow had to be made and then a separate switch means for activating the snowplow headlamps had to be actuated. The vehicle headlamps are then turned off by a conventional switch in the interior of the vehicle. For example, see U.S. Pat. No. 4,280,062 issue to Miller et al on Jul. 21, 1981. In this conventional setup, more than one means for controlling the illumination of the vehicle headlamps and the snowplow headlamps was necessary.

The problem with the conventional headlamp set-up control system is the inconvenience of having the snowplow headlamp switch means on the snowplow itself or the difficulty and expense of installing the snowplow headlamp switch means on the instrument panel of the vehicle. Existing vehicle instrument dash boards contain so many tightly arranged components that it is difficult to find an open access for the installation of a snowplow headlamp switch. Vehicle dash boards are also normally styled to be aesthetically pleasing. The installation of an additional switch on the dash board frequently is time consuming and in an inconvenient location or is unsightly.

SUMMARY OF THE INVENTION

The present invention provides an automatic headlamp switching system that enables an operator to use an existing vehicle headlamp switch to operate the headlamps on an accessory unit attached thereto. The invention includes a primary circuit which includes a primary light source, an energy source, and first switch means for connecting the energy source and the primary light source so that the primary light source is selectively energizable. The invention also includes a coupling means for selectively connecting and disconnecting the accessory unit to the vehicle and a secondary circuit including a secondary light source and a second switch means connectable with the primary and secondary light sources. The second switch means is operative when the coupling means connects the accessory unit to the vehicle and when the second switch means is activated to interrupt the primary circuit from the energy source to the primary light source and simultaneously complete the secondary circuit from the energy source to the secondary light source.

Other features and advantages of the invention will become apparent to those of ordinary skill in the art upon review of the following detailed description, claims and drawings.

BRIEF DESCRIPTION OF THE DRAWINGS

FIG. 1 is a perspective view of a vehicle and accessory unit of the type to which this invention relates;

FIG. 2 is a diagram of a circuit arrangement employed in the device according to the invention; and FIG. 3 is a perspective view of a wiring harness constructed in accordance with the invention.

DETAILED DESCRIPTION OF THE PREFERRED EMBODIMENT

Illustrated in FIG. 1 is a vehicle 10 with an accessory unit 12 in a position for attachment thereto. In the illustrated embodiment, the accessory unit 12 is a snowplow but could be any type of material handling device. As shown in FIGS. 1-3, the vehicle 10 includes conventional components including a primary light source or pair of vehicle headlamps 14 and 16 with low beam light and high beam light capability, right and left turn signal lights 18 and 20 respectively, a battery 22 providing an energy source, a turn signal switch 24 to selectively illuminate the vehicle turn signal lights 18 and 20, vehicle parking lights 26 and 28, a vehicle parking light circuit 30 which includes the vehicle parking lights 26 and 28 and the battery 22, vehicle headlamp connector means such as a pair of 3-prong female vehicle headlamp connectors 32, and a first switch means 36 for conventionally operating the vehicle headlamps 14 and 16 and vehicle parking lights 26 and 28. In the preferred embodiment, the first switch means 36 is a conventional vehicle parking/headlamp switch 38 with a low/high beam selector 40 on the vehicle instrument panel. The first switch means 36 is of the type that has a first position for illuminating the vehicle parking lights 26 and 28, has a second position for illuminating the low beam lights 42 and 43 of the vehicle headlamps 14 and 16 while continuing to illuminated the vehicle parking lights 26 and 28, and has a third position for illuminating the high beam lights 44 and 45 of the vehicle headlamps 14 and 16 while continuing to illuminate the vehicle parking lights 26 and 28.

As best shown in FIG. 3 in dotted lines, the vehicle 10 also includes a conventional primary circuit 46 which includes the vehicle headlamps 14 and 16, the 3-prong female vehicle headlamp connectors 32, the battery 22, and the first switch means 36 which includes parking/headlamp switch 38 with low/high beam selector 40 (FIG. 2). The primary circuit 46 provides the circuitry to enable the operator to selectively illuminate the vehicle headlamps 14 and 16 and vehicle parking lights 26 and 28 through the operation of the parking/headlamp switch 38 with the low/high beam selector 40. Current from the battery 22 is carried along conductor 48 to the parking/headlamp switch 38 with low/high beam selector 40. If the parking/headlamp switch 38 with low/high beam selector 40 is in its first position, current will travel through conductors 50 and 52 to illuminate the vehicle left parking light 28 and current will also travel through conductors 50 and 51 to illuminate the vehicle right parking light 26. If the parking/headlamp switch is in its second position, current will travel along conductors 50, 51 and 52 as described above to illuminate the vehicle parking lights 26 and 28, and current will also travel along conductor 54 through the 3-prong female vehicle headlamp connectors 32 to illuminate the low beam lights 42 and 43 (FIG. 2) of the vehicle headlamps 14 and 16. If the parking/headlamp switch 38 is in its third position, current will travel along conductors 50, 51 and 52 as described above to illuminate the vehicle parking lights 26 and 28 and current will also travel along conductor 56 through the 3-prong female vehicle headlamp connectors 32 to illuminate the high beam lights 44 and 45 (FIG. 2) of the vehicle headlamps 14 and 16.

As best seen in FIG. 1, the vehicle 10 is also provided with a snowplow hitch 58 which allows the snowplow 12 to be detachably mounted on the vehicle 10. In addition, a female plow plug 60 and a female battery plug 62 are respectively mounted to be accessible at the grill 64 of the vehicle 10. The connections to and from these plugs will be described in detailed in a later section.

Generally, the snowplow 12 as depicted in FIG. 1 and contemplated by the invention is of a conventional type which includes a snowplow frame 66 adapted to be detachably mounted on the snowplow hitch 58, a snowplow blade 68, prime movers (not shown) for selectively raising, lowering and angling the blade relative to the vehicle, and a pair of snowplow headlamp assemblies 70. Each snowplow headlamp assembly 70 constitutes a secondary light source such as snowplow headlamps 72 and 73 with low beam light and high beam light capability, right and left parking lights 74 and 75 respectively, and right and left turn signal lights 77 and 79 respectively. The snowplow headlamps 72 and 73 along with the battery 22 and parking/headlamp switch 38 with low/high beam selector 40, are part of a secondary circuit 76 generally indicated on FIG. 2. The snowplow 12 also includes a male plow plug 78 and a male battery plug 80.

To make the electrical connections between the vehicle 10 and the snowplow 12, a coupling means is employed. The coupling means in the preferred embodiment is the female and male plow plugs 60 and 78 respectively and the female and male battery plugs 62 and 80 respectively. To make the coupling connections between the vehicle 10 and the snowplow 12, the female battery plug 62 is interengaged with the male battery plug 80 (see arrow FIG. 2) and the female plow plug 60 is interengaged with the male plow plug 78 (see arrow FIG. 2).

The female and male battery plugs 62 and 80 respectively, as seen in FIGS. 1-2, are of the conventional type and include two pins 82 and 84 on the male battery plug 80 and two pin receptacles 86 and 88 for those respective pins on the female battery plug 62. The operation of pin 84 and its corresponding pin receptacle 88 will be described in detail below. Pin 82 and its corresponding pin receptacle 86 are utilized to make the conventional connections between the vehicle 10 and the snowplow 12 necessary to energize the prime movers of the snowplow 12 and will not be further described because they are not part of the invention.

The female and male plow plugs 60 and 78 respectively, as seen in FIGS. 1 and 2, are also of the conventional type. The male plow plug 78 can accommodate twelve pins of which only pins 94, 95, 98, 102, 103 and 104 are specifically shown. The female plow plug 60 includes twelve pin receptacles of which only pin receptacles 106, 107, 110, 114, 115, 116 will be hereafter described. Pins 102 and 103 and their corresponding pin receptacles 114 and 115 function to operate the snowplow turn signal lights 77 and 79 and will not be hereafter described. The other locations for pins on the male plow plug 78 (not specifically numbered) and their corresponding pin receptacles (not specifically numbered) operate to perform other functions with respect to the snowplow 12 and will not be hereafter described because they are not part of the operation of the invention. The function of male plow plug pins 94, 95, 98, and 104 and their corresponding pin receptacle 106, 107, 110, 116 will be detailed hereafter when describing the operation of the invention.

In the preferred embodiment of the invention as illustrated in FIG. 2, a second switch means 144 is operatively incorporated into both the primary circuit 46 and the secondary circuit 76. When the female battery plug 62 and the female plow plug 60 on the vehicle 10 are not interengaged with the respective male battery plug 80 and the male plow plug 78 on the snowplow 12, the second switch means 144 allows the primary circuit 46 to function normally and illuminate the vehicle headlamps 14 and 16 when the parking/headlamp switch 38 with low/high beam selector 40 in is its second or third position. When the female battery plug 62 and the female plow plug 60 on the vehicle 10 are interengaged with the respective male battery plug 80 and the male plow plug 78 on the snowplow 12, the second switch means 144 interrupts the primary circuit 46 and simultaneously completes the secondary circuit 76 thus illuminating the snowplow headlamps 72 and 73 when the parking/headlamp switch 38 with low/high beam selector 40 is in its second or third position. Because the primary circuit 46 is interrupted, the parking/headlamp switch 38 with low/high beam selector 40 will not function to illuminate the vehicle headlamps 14 and 16 as will now be explained in further detail.

The second switch means 144 in the preferred embodiment constitutes a first relay 146 and a second relay 148. The first and second relays 146 and 148 respectively are of the single pole double throw (SPDT) type. The first relay 146 includes a first coil 150 and a first relay switch 152. The first relay switch 152 of the first relay 146 is shown in its normally closed position (solid lines) and shown in its open position (dotted lines). The second relay 148 includes a second coil 154 and a second relay switch 156. The second relay switch 156 of the second relay 148 is shown in its normally closed position (solid lines) and shown in its open position (dotted lines). The input sides of the first and second coils 150 and 154 of the respective relays 146 and 148 are connected to the vehicle parking light circuit 30 via conductors 51 and 162 for the first coil 150 and conductors 51 and 160 for the second coil 154. The output sides of the first and second coils 150 and 154 are connectable to ground via the negative terminal of battery 22 as will be described hereafter.

The operation of the automatic headlamp switching system in the preferred embodiment is as follows.

A. Snowplow Not Coupled To Vehicle

When the female and male plow plugs 60 and 78 are not interengaged and the female and male battery plugs 62 and 80 are not interengaged, the automatic headlamp switching circuit operates as follows with reference to FIG. 2.

As previously explained, if the parking/headlamp switch 38 with low/high beam selector 40 is in its first position, only the vehicle parking lights 26 and 28 will be illuminated as follows. Current from the battery 22 travels through conductor 48, through the parking-/headlamp switch 38, then through conductors 50 and 52 to illuminate the vehicle left parking light 28 and also through conductors 50 and 51 to illuminate the vehicle right parking lights 26. The path to ground from vehicle parking lights 26 and 28 occurs along conductors 195 and 193 respectively.

If the parking/headlamp switch 38 with low/high beam selector 40 is moved to its second position, the primary circuit 46 is completed and the low beam lights 42 and 43 of the vehicle headlamps 14 and 16 will be illuminated as follows. Current travels from the battery 22, through conductor 48, through the parking/headlamp switch 38, through the low/high beam selector 40, through conductor 54, through the 3-prong female vehicle headlamp connector 32, through a 3-prong male harness secondary connector 166, through conductor 168 and into the first relay 146. The first relay switch 152 is biased to be in its normally closed position and current will thus flow across the first relay switch 152 in its normally closed position, through conductors 169, then through a pair of 3-prong female harness primary connectors 186 to the respective vehicle low beam lights 42 and 43 thus causing their illumination. The return path to ground from the vehicle low beam lights 42 and 43 occurs through the pair of 3-prong female harness primary connectors 186, through conductors 170 and 167, through the 3-prong male harness secondary connector 166, through the 3-prong female vehicle headlamp connector 32, then to ground.

The first coil 150 of the first relay 146 is connected to a current source from the vehicle parking light circuit 30 on conductor 50 via conductors 51 and 162. However, this current does not energize the first coil 150 to cause the first relay switch 152 to change positions from its normally closed position to an open position because when the snowplow 12 is not electrically connected to the vehicle 12, there is no path from this coil back to ground. The path from the first coil 150 includes conductor 131, however, conductor 131 terminates at pin receptacle 107 of the female plow plug 60.

If the parking/headlamp switch 38 with low/high beam selector 40 is in its third position, the primary circuit 46 is completed and the vehicle high beam lights 44 and 45 will be illuminated as follows. Current travels from the battery 22, through conductor 48, through the parking/headlamp switch 38, through the low/high beam selector 40, through conductor 56, through the 3-prong female vehicle headlamp connector 32, through the 3-prong male harness secondary connector 166, through conductor 173 and into the second relay 148. The second relay switch 156 will be in its normally closed position and current will thus flow across the second relay switch 156 in its normally closed position, through conductor 174, then through the pair of 3-prong female harness primary connectors 186 to the respective vehicle high beam lights 44 and 45 thus causing their illumination. The return path to ground from the vehicle high beam lights 44 and 45 occurs through the pair of 3-prong female harness primary connectors 186, through conductors 170 and 167, through the 3-prong male harness secondary connector 166, through the 3-prong female vehicle headlamp connector 32, and then to ground.

The second coil 154 of the second relay 148 also has a connection to a current source from the vehicle parking light circuit 30 on conductor 50 via conductors 51 and 160. However, this current does not energize the second coil 154 to cause the second relay switch 156 to change positions from its normally closed position to an open position because there is no path from this coil back to ground as discussed above with respect to the illumination of the vehicle low beam lights.

B. Snowplow Coupled To Vehicle

When the female and male plow plugs 60 and 78 are interengaged and the female and male battery plugs 62 and 80 are interengaged, the automatic headlamp switching circuit operates as follows with reference to FIG. 2.

If the parking/headlamp switch 38 with low/high beam selector is in its first position, the vehicle parking lights 26 and 28 will be illuminated along with the snowplow parking lights 74 and 75 as follows. Current from the battery 22 travels through conductors 48, through the parking/headlamp switch 38, through conductor 50, then through conductors 51 and 52 to illuminate the vehicle parking lights 26 and 28 respectively and then also through conductors 51 and 141, across the interengaged female and male plow plugs 60 and 78 via pin 104 and pin receptacle 116, through conductors 128 and 161 to illuminate the snowplow parking lights 74 and 75. The path to ground from vehicle parking lights 26 and 28 occurs along conductors 195 and 193 respectively. The path to ground from the snowplow parking lights 74 and 75 occurs through conductors 165 and 181 for the snowplow left parking light 75 and through conductors 183 and 181 for the snowplow right parking light 74, through conductor 119, across the interengaged male and female battery plug 80 and 62 via pin 84 and pin receptacle 88, then along conductor 180 to the negative terminal of battery 22 and ground.

If the parking/headlamp switch 38 with low/high beam selector 40 is moved to its second position, the primary circuit 46 is interrupted, the secondary circuit 76 is simultaneously completed and the snowplow low beam lights 176 and 177 will be illuminated as follows. The first coil 150 of the first relay 146 receives current from the vehicle parking light circuit 30 (and more specifically conductor 50) through conductors 51 and 162. This current now can energize the first coil 150 to cause the first relay switch 152 to change from its normally closed position to its open position because there is now provided a path from this coil back to ground. That path includes conductors 131, across the interengaged female and male plow plugs 60 and 78 via pin 95 and pin receptacle 107, through conductor 119, across the interengaged male and female battery plugs 80 and 62 via pin 84 and pin receptacle 88, then along conductor 180 back to the negative terminal of the battery 22 and ground. Because the position of the first relay switch 152 in the first relay 146 changes from its normally closed position to an open position, the primary circuit 46 to the vehicle low beam lights 42 and 43 is interrupted such that the vehicle low beam lights 42 and 43 are no longer connected to the battery 22 and thus are no longer illuminated.

When the first relay switch 152 of the first relay 146 is in its open position, the secondary circuit 76 is completed which causes the illumination of only the snowplow low beam lights 176 and 177. The path of the secondary circuit 76 is as follows. Current from the vehicle battery 22 is carried through conductor 48, through the parking/headlamp switch 38, through the low/high beam selector 40, through conductor 54, through the 3-prong female vehicle headlamp connector 32, through the 3-prong male harness secondary connector 166, through conductor 168, into the first relay 146, across the first relay switch 152 in its open position, through conductor 134, across the interengaged female and male plow plugs 60 and 78 via pin 98 and pin receptacle 110, through conductors 122 and 175 to the respective snowplow low beam lights 176 and 177 thus causing their illumination. The return path to ground from the snowplow low beams lights 176 and 177 includes conductors 181 and 119, across the interengaged male and female battery plugs 80 and 62 via pin 84 and pin receptacle 88, and through conductor 180 which terminates at the negative terminal of the battery 22 and ground.

If the parking/headlamp switch 38 with low/high beam selector 40 is moved to its third position, the primary circuit 46 is also interrupted, the secondary circuit 76 is simultaneously completed and the snowplow high beam lights 178 and 179 will be illuminated as follows. The second coil 154 of the second relay 148 receives current from the vehicle parking light circuit 30 (and more specifically conductor 50) through conductors 51 and 160. This current will energize the second coil 154 to cause the second relay switch 156 to change from its normally closed position to an open position because there is now provided a path from the second coil 154 back to ground. That path from the second coil 154 to ground includes conductors 171 and 131, across the interengaged female and male plow plugs 60 and 78 via pin 95 and pin receptacle 107, through conductor 119, across the interengaged male and female battery plugs 80 and 62 via pin 84 and receptacle 88, then along conductor 180 back to the negative terminal of the battery 22 and ground.

Because the position of the second relay switch 156 in the second relay 148 changes from its normally closed position to an open position, the primary circuit 46 to the vehicle high beam lights 44 and 45 is interrupted such that the vehicle high beam lights 44 and 45 are no longer connected to the battery 22 and thus are no longer illuminated. When the second relay switch 156 of the second relay 148 is in its open position, the secondary circuit 76 is completed which causes the illumination of the snowplow high beam lights 178 and 179. The path of the secondary circuit 76 is as follows. Current from the vehicle battery 22 flows through conductor 48, through the parking/headlamp switch 38, through the low/high beam selector 40, through conductor 56, through the 3-prong female vehicle headlamp connector 32, through the 3-prong male harness secondary connector 166, through conductor 173, into the second relay 148, across the second relay switch 156 in its open position, through conductor 130, across the interengaged female and male plow plugs 60 and 78 via pin 94 and pin receptacle 106, through conductors 118 and 167 to the respective snowplow high beam lights 178 and 179 thus causing their illumination. The return path to ground from the snowplow high beam lights 178 and 179 occurs via conductors 181 and 119, across the interengaged male and female battery plugs 80 and 62 via pin 84 and pin receptacle 88, and conductor 180 which terminates at the negative terminal of the battery 22 and ground.

The physical embodiment of a portion of the circuit of FIG. 2 is illustrated by solid lines in FIG. 3. More specifically, what is illustrated is a wiring harness 184 which includes a pair of 3-prong female harness primary connectors 186, a harness secondary connector means such as a 3-prong male harness secondary connector 166, a second switch means 144 which is illustrated as first and second relays 146 and 148 respectively, a secondary parking light connector means such as harness parking circuit splice 190, a coupling means which is depicted in FIG. 3 as a female plow plug 60 and as the female battery plug 62. The various connections between these components will now be described.

The pair of 3-prong female harness primary connectors 186 are designed to plug into the pair of vehicle headlamps 14 and 16 and include conductor 169 (FIG. 2) connected to and conductor 170 (FIG. 2) returning from the vehicle low light beam lights 42 and 43 and conductor 174 (FIG. 2) connected to and conductor 170 (FIG. 2) returning from the vehicle high beam lights 44 and 45. The 3-prong male harness secondary connector 166 is designed to plug into one of the vehicle headlamp connectors 32 and includes the conductors 167, 173 and 168 (FIG. 2). The first relay 146 and the second relay 148 have the same conductor connections as in FIG. 2. The harness parking circuit splice 190 is adapted to be spliced into the vehicle parking light circuit 30 along conductor 50. The female plow plug 60 has the conductors 130, 131, 134, 139, 140 and 141 which are interconnected with the various components as illustrated in FIG. 2. As discussed previously, the other pin receptacles on female plow plug 60 that are not specifically numbered are generally identified in FIG. 3 as cable 198.

To install the wiring harness 184 into the vehicle 12, the vehicle headlamp connectors 32 (shown in dotted lines) are disconnected from the vehicle headlamps 14 and 16 and the pair of 3-prong female harness primary connectors 186 are plugged into their respective vehicle headlamps 14 and 16. The 3-prong male harness secondary connector 166 is plugged into one of the vehicle headlamp connectors 32. The other of the vehicle headlamp connectors 32 is left disconnected. The harness parking circuit splice 190 is spliced into the vehicle parking lamp circuit 30 along conductor 50.

Although one embodiment of the present invention has been illustrated and described, it will be apparent to those skilled in the art that various changes and modifications may be made therein without departing from the spirit of the invention or from the scope of the appended claims.

What is claimed is:

1. An accessory unit for attachment to a vehicle of the type that has a primary light circuit including a primary light source, an energy source, a first switch means for connecting said energy source and said primary light source so that when said first switch means is activated said primary light source is selectively illuminated, said accessory unit comprising:

coupling means for selectively connecting and disconnecting said accessory unit to said vehicle;

a secondary light circuit including a secondary light source on said accessory unit; and a second switch means connectable into said primary and secondary light circuits, said second switch means activated by said coupling means connecting said accessory unit to said vehicle and by said first switch means being activated for interrupting said primary light circuit and for simultaneously completing said secondary light circuit by connecting said energy source to said secondary light source so that said secondary light source is illuminated and said primary light source is de-illuminated.

2. In a vehicle having an accessory unit attached thereto, the combination of:

a primary circuit including a primary light source, an energy source, and first switch means for connecting said energy source and said primary light source so that said primary light source is selectively energizable;

a coupling means for selectively connecting and disconnecting said accessory unit to said vehicle;

a secondary circuit including a secondary light source; and a second switch means connectable with said primary and secondary light sources and operative when said coupling means connects said accessory unit to said vehicle and when said second switch means is activated to interrupt the primary circuit from said energy source to said primary light source and simultaneously complete said secondary circuit from said energy source to said secondary light source, wherein said second switch means is activated by said first switch means.

3. The as set forth in claim 1 wherein said coupling means includes a manually connectable and disconnectable plug member that electrically connects said accessory unit to said vehicle.

4. The combination as set forth in claim 2 wherein said second switch means includes a relay.

5. The combination as set forth in claim 2 wherein said primary light source includes a low light beam and a high light beam, said secondary light source includes a low light beam and a high light beam, said first switch means connecting said energy source to either said low light beam or said high light beam of the primary light source to selectively energize said low or said high light beam of said primary light source, and said second switch means, when operative, interrupting said primary circuit from said energy source to either said low or said high light beam of said primary light source and simultaneously completing said secondary circuit from said energy source to either said low or said high light beam of said secondary light source.

6. The combination as set forth in claim 5 wherein said second switch means includes first and second relays, said first relay completing said secondary circuit from said energy source to said low light beam of said secondary light source and interrupting said primary circuit from said energy source to said low light beam of said primary light source, and said second relay completing said secondary circuit from said energy source to said high light beam of said secondary light source and interrupting said primary circuit from said energy source to said high light beam of said primary light source.

7. In a vehicle having an accessory unit attached thereto, the combination of:

a primary circuit on said vehicle including a primary light source, an energy source, and a switch for connecting said energy source and said primary light source so that said primary light source is selectively energizable;

a secondary light circuit on said accessory unit including a secondary light source;

a coupling means for selectively connecting and disconnecting said accessory unit to said vehicle; and switching means automatically activated when said accessory unit is coupled to said vehicle to interrupt said primary circuit and to connect said secondary light circuit to said energy source so that said secondary light source is selectively energizable by said energy source and said primary circuit is de-energized.

8. The combination as set forth in claim 4 wherein said primary light circuit includes a parking lamp circuit and wherein said relay is connected to said energy source through said parking lamp circuit.

9. A wiring harness for use in attaching an accessory unit to a vehicle of the type that includes vehicle headlamp means, vehicle headlamp connector means, an energy source, and first switch means, said first switch means when activated selectively connecting said energy source to cause the illumination of said vehicle headlamp means, and said accessory unit including secondary headlamp means, said wiring harness comprising:

a harness primary headlamp connector means for engagement with said vehicle headlamp means;

a harness secondary connector means for engagement with said vehicle headlamp connector means;

a coupling means for electrically connecting said wiring harness to said accessory unit;

a second switch means for selectively controlling the illumination of said vehicle headlamp means and said accessory unit headlamp means, said second switch means connecting said energy source to said vehicle headlamp means when said first switch means is activated and when said coupling means is not electrically connecting said wiring harness to said accessory unit, and said second switch means connecting said energy source to said accessory unit headlamp means when said first switch means is activated and when said coupling means is electrically connecting said wiring harness to said accessory unit; and a conductor means operatively interconnecting said harness primary headlamp connector means, said harness secondary connector means, said coupling means, and said second switch means.

10. The wiring harness as set forth in claim 9 wherein said second switch means includes a relay.

11. The wiring harness as set forth in claim 9 wherein said vehicle headlamp means includes a low light beam and a high light beam, said accessory unit headlamp means includes a low light beam and a high light beam, said first switch means connecting said energy source to said low or said high light beams of said vehicle headlamp means, said second switch means operative to disconnect said energy source from said low and said high light beams of said vehicle headlamp means and connect said energy source to said low and said high light beams of said accessory unit headlamp means.

12. The wiring harness as set forth in claim 11 wherein said second switch means includes first and second relays, said first relay selectively controlling the illumination of said low light beam of said vehicle headlamp means and said low light beam of said accessory unit headlamp means, and said second relay selectively controlling the illumination of said high light beam of said vehicle headlamp means and said high light beam of said accessory unit headlamp means.

13. The wiring harness as set forth in claim 9 wherein said coupling means includes a manually connectable and disconnectable plug member that electrically connects said accessory unit to said vehicle.

14. The wiring harness as set forth in claim 9 wherein said vehicle further includes vehicle parking light means, and a vehicle parking light circuit, and wherein said wiring harness further includes a secondary parking light connector means connected to said conductor means for engagement with said vehicle parking light means.

15. In a vehicle having an accessory unit attached thereto as set forth in claim 7, wherein said switching means includes said switch for selectively energizing said secondary light source.

16. An accessory unit for attachment to a vehicle of the type that has a primary light circuit including a primary light source, an energy source, a first switch means for connecting said energy source and said primary light source so that when said first switch means is activated said primary light source is selectively illuminated, said accessory unit comprising:
- a material handling unit,
- coupling means for selectively connecting and disconnecting said accessory unit to said vehicle;
- a secondary light circuit including a secondary light source on said accessory unit;
- a second switch means connectable into said primary and secondary light circuits, said second switch means operative, when said coupling means connects said accessory unit to said vehicle and when said first switch means is activated, to interrupt said primary light circuit and simultaneously complete said secondary light circuit by connecting said energy source to said secondary light source so that said secondary light source is illuminated and said primary light source is not illuminated,
- and wherein said secondary light source is mounted on said material handling unit.

17. The accessory unit as set forth in claim 16 wherein said material handling unit comprises a snowplow.

18. In a vehicle having an accessory unit attached thereto, the combination of:
- a primary circuit on said vehicle including a primary light source, an energy source, and a switch for connecting said energy source and said first primary light source so that said primary light source is selectively energizable;
- a secondary light circuit on said accessory unit including a secondary light source; and
- switching means for interrupting the primary circuit and for connecting said energy source to said secondary light source so that said secondary light source is selectively energizable in response to said switch.

* * * * *